3,120,751
GRAVITOMETERS
Henry B. Dismukes, Dallas, Tex., and Grady M. Bowen, Shreveport, La., assignors to United Gas Corporation, Shreveport, La., a corporation of Delaware
Filed Jan. 15, 1960, Ser. No. 2,706
7 Claims. (Cl. 73—30)

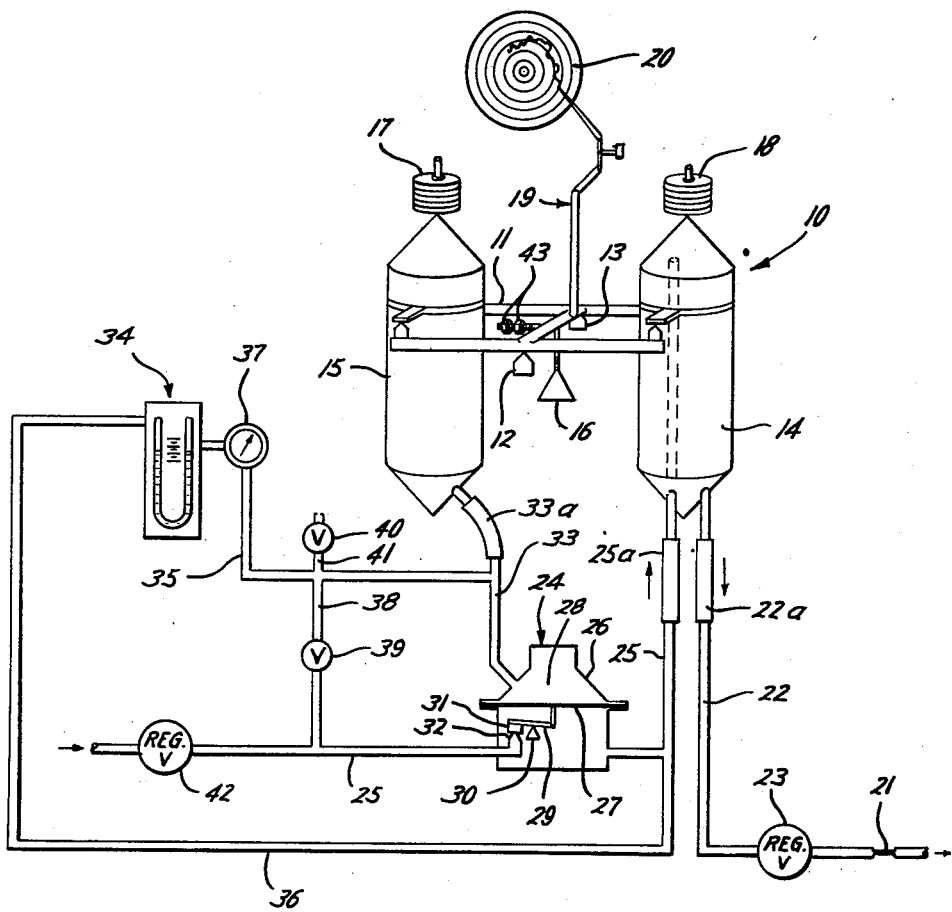

This invention relates to gravitometers, and particularly to gravitometers of the balance type.

One form of gravitometer which has been used to measure the density of gas is known as the balance gravitometer in which a sealed chamber and a sample chamber are balanced on a beam. The gravity of the sample gas is measured against the gravity of the gas in the sealed chamber. The great difficulty with this type of gravitometer lies in the lack of a suitable temperature compensation device.

Various types of temperature compensation devices have been proposed for use with balance gravitometers. For instance, it has been proposed to use a Bourdon tube to vary the position of a compensating mass with temperature changes.

The temperature correcting devices heretofore known have required critical adjustments with changing temperatures of any magnitude by highly trained technicians, and for this reason they have not been entirely reliable.

It is an object of this invention to provide a balance type gravitometer in which variations in the temperature are positively compensated for, and the instrument need not be attended by highly trained technicians to obtain satisfactory operation.

Another object is to provide a balance type gravitometer which does not require critical adjustments with variations in temperature.

Another object is to provide a balance type gravitometer which positively compensates for variations in temperature, barometric pressure and composition of the atmosphere around the gravitometer.

Another object is to provide a balance type gravitometer which positively compensates for variations in temperature of the flowing sample.

Another object is to provide a balance type gravitometer in which the flow through the gravitometer may be maintained at a low constant volume to avoid unnecessary waste of gas.

Another object is to provide a balance type gravitometer in which the pressure in the sealed and sample vessels is always equal regardless of temperature changes to thereby compensate for temperature changes.

Another object is to provide a balance type gravitometer with means for visually indicating whether it is functioning properly.

Other objects, features and advantages will be apparent from the drawings, the specification and the claims.

In accordance with this invention the sample vessel of a balance type gravitometer has its outlet controlled to maintain a back pressure upon the sample vessel. The inlet for the sample vessel has a control mechanism associated therewith which regulates the flow of gas to the sample vessel to thereby regulate the pressure within the vessel. This control mechanism is controlled in its operation by the pressure in the sealed vessel. Preferably, the control setup is such as to maintain the same pressure in the two vessels of the balance.

In order that the invention may be clearly understood, the preferred form of the invention is shown schematically in the single figure of the accompanying drawing.

In the preferred form of the invention a balance indicated generally at 10 is employed. This balance includes the balance beam 11 supported on pivots 12 and 13. A closed sample vessel 14 and a closed sealed vessel 15 are supported on the balance beam on opposite sides of the pivots. These vessels are preferably of equal volume and positioned at equal distances from the pivots 12 and 13. With this arrangement all variations in buoyancy of the sample vessel caused by changes in the density of the atmosphere will be compensated by an equal and opposite force acting on the sealed vessel.

Suitable calibrating mechanism is provided for the balance by the vertically adjustable dampening weight 16 and the removable weights 17 on sealed vessel 15 and the removable weights 18 on sample vessel 14.

Measurement of gravity of gas from a pipeline is desirably carried on continuously, and for this purpose the moments of the balance beam 11 are measured by a pen arm linkage indicated generally at 19 and recorded on chart 20.

In accordance with this invention the pressure of the gas to be measured is so adjusted as it passes through vessel 14 that it is proportionate to the pressure in the sealed vessel 15 which may be considered as a standard. Preferably, the pressures within the two vessels are maintained constant. This is accomplished by holding a back pressure on the sample vessel 14 while regulating the pressure therein in response to changes in pressure in the sealed vessel. These changes in pressure, of course, occur with changes in temperature.

The means for maintaining a back pressure on the sample vessel may take any desired form. One of the simplest means which may be employed is to provide a restriction or orifice such as shown at 21 in the outlet conduit 22 which conducts gas from the sample vessel.

Generally the gas to be measured will be taken from a high pressure source and reduced to a very low pressure. It is, therefore, more economical to flare the measured gas than to re-pressure it for return to its source. When the gas is reduced in pressure to a few pounds, as is preferred in carrying out this invention, the amount of gas passing through the measuring system is desirably held at a minimum. It is difficult to accomplish this objective with the simple back pressure orifice 21, and therefore an additional means is preferably provided in the outlet conduit 22 to control the volume of flow through the sample vessel. This means may be provided by a pressure reducing regulator valve such as indicated at 23 in the outlet conduit 22 upstream of the orifice 21. By way of example, regulator model No. 912 of the Fisher Company may be utilized for this purpose.

The pressure in sample vessel 14 is controlled by a pressure regulating apparatus shown generally at 24. As noted above, this apparatus is controlled by the pressure within the sealed vessel 15. Preferably, this apparatus is a pressure responsive pressure regulator which will maintain the pressure in the inlet conduit 25 to the sample vessel at a pressure proportional to the pressure in the sealed vessel and preferably at substantially the same pressure. Any suitable pressure controlled pressure regulator valve may be employed for maintaining the pressure in the two vessels proportional. By way of example, a Fisher regulator model No. 912 may be slightly modified and used. This regulator is shown schematically at 24. As manufactured it includes a spring under compression in the chamber 26 and bearing upon the diaphragm 27. This spring is removed and the chamber 28 in which it was mounted is utilized as a control pressure chamber. As thus modified, the diaphragm 27 will flex in response to changes in pressure in the chamber 28 to control flow of fluid from the source to the sample vessel 14.

In operation, an increase in pressure on the diaphragm results in movement of the valve support arm 29 about pivot 30 to lift the valve member 31 off of seat 32 to permit flow of fluid from the source to the sample vessel. In like manner, a reduction of pressure in the sample vessel 14 results in a reduction of pressure on the underside of diaphragm 27 to open the valve. Thus, if we assume a constant pressure in chamber 28, the same constant pressure will be maintained in sample vessel 14 by the action of regulator valve 24. A change in pressure in chamber 28 will result in a change in pressure in vessel 14 to thus maintain the pressures in chamber 28 and vessel 14 equal at all times.

In order that the pressure in the sealed vessel 15 be constantly reflected in chamber 28 of regulator valve 24, a conduit 33 is provided which interconnects the vessel 15 and chamber 28. Thus, as changes in temperature induce changes of pressure in sealed vessel 15, these changes will be reflected in control chamber 28 of valve 24.

A visual indication that the system is working properly may be provided by installing a U-tube mercury manometer 34 across the two vessels 14 and 15. The mercury should, of course, stand at a common level in each leg of the U-tube. The manometer may be connected across the two vessels by connecting one side of the manometer to the conduit 33 between the sealed vessel and valve 24, as through conduit 35, and connecting the other leg of the manometer to the inlet conduit 25 for the sample vessel 14, as by conduit 36.

If desired, a pressure gauge 37 may be placed in the system to indicate the pressure in the sealed vessel 15.

The gas in sealed vessel 15 is preferably obtained from the inlet conduit 25 through a conduit 38 controlled by valve 39. If an excess pressure occurs in sealed vessel 15, or it is desired to reduce the pressure in the vessel for any reason, this may be accomplished by opening valve 40 in vent conduit 41 associated with conduit 35.

In operation, gas obtained from a source to be measured is introduced into inlet line 25 through a suitable pressure reduction regulator valve 42 which may be a Fisher Regulator Model No. 67. For instance, a gas supply reduced from line pressure by means not shown to about 15 pounds, may be further reduced by regulator 42 to about 6 pounds. Pressure may be admitted from inlet line 25 to sealed vessel 15 through valve 39 until pressure gauge 37 indicates a pressure within sealed vessel 15 of, say, 3.5 pounds. Valve 39 is then closed and the regulator valve 24, being controlled by this 3.5 pounds of pressure in the control chamber 28, will maintain in sample vessel 14 a pressure of 3.5 pounds.

As the measured gas leaves vessel 14, it is reduced in pressure by regulator 23 to, say, 1 pound and flared through the back pressure orifice 21. This arrangement will maintain a constant low volume flow of gas through the system.

As the gas to be measured changes in density, the balance beam will rock about its pivot points to indicate a difference in weight in the reference gas in sealed vessel 15 and the gas being measured in sample vessel 14. This rocking movement is permitted by the conduits connected with these vessels having flexible portions 33a, 25a and 22a.

After the sealed vessel 15 is filled, a sample of the gas flowing through the sample vessel is carefully measured to determine its specific gravity. As the specific gravity of the gas first flowing through the system is recorded on chart 20 and this gravity is known by determination by other means, changes in specific gravity may thereafter be determined by comparison of the recording value on chart 20 with the original value recorded on the chart. If desired, the pen may be originally adjusted to record on the chart the exact specific gravity of the gas first flowing through the system, and thereafter the record on the chart will reflect the actual specific gravity of the sample being measured.

In calibrating the instrument a predetermined number of weights 17 or 18 are removed and the dampening weight 16 adjusted vertically until the removal of the predetermined number of weights results in a predetermined movement of the recording pen across chart 20. Balancing weights 43 may be adjusted to zero the chart.

From the above description it will be seen that all of the objects of this invention have been accomplished. The buoyancy of the surrounding atmosphere will not affect the system as vessels of equal volume are employed. Temperature will not affect the recording as the pressure changes induced by temperature changes in vessel 15 will be accurately produced in sample vessel 14.

Only a small volume of gas will pass through the system, and therefore it may be reduced in pressure to a very low value for very accurate determination of its specific gravity. As a very small amount of gas passes through the system, this gas may be economically flared to atmosphere.

It is not necesary to re-calibrate or adjust the gravitometer with substantial changes in temperature, and therefore the gravitometer need not be attended by highly skilled personnel. The only attention needed is the periodic changing of the chart 20, and this may be accomplished by unskilled personnel who can also note the level of mercury in the manometer 34 and determine whether or not the gravitometer is functioning properly.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A gravitometer comprising, a balance including a closed sealed vessel and a closed sample vessel supported by a balance beam on opposite sides of a pivot point, means for measuring the movements of the balance beam about its pivot, an outlet conduit connected to said sample vessel, means in said outlet conduit for continuously releasing gas from the sample vessel while maintaining a back pressure on the sample vessel, an inlet conduit connected to said sample vessel, a pressure responsive pressure reducing regulator valve having a control pressure chamber controlling flow through said inlet conduit, and a conduit interconnecting the sealed vessel and the control pressure chamber of the regulator valve whereby the pressure in the sample vessel is controlled by the pressure in the sealed vessel.

2. A gravitometer comprising, a balance including a closed sealed vessel and a closed sample vessel supported by a balance beam on opposite sides of a pivot point, means for measuring the movements of the balance beam about its pivot, an outlet conduit connected to said sample vessel, a restriction in the outlet conduit for controlling release of gas from and maintaining a back pressure on the sample vessel, an inlet conduit connected to said sample vessel, a pressure responsive pressure reducing regulator valve having a control pressure chamber controlling flow through said inlet conduit, and a conduit interconnecting the sealed vessel and the control pressure chamber of the regulator valve whereby the pressure in the sample vessel is controlled by the pressure in the sealed vessel.

3. A gravitometer comprising, a balance including a closed sealed vessel and a closed sample vessel supported by a balance beam on opposite sides of a piovt point, means for measuring the movements of the balance beam about its pivot, an outlet conduit connected to said sample vessel, a pressure reducing regulator valve in the outlet conduit and a restriction in the outlet conduit downstream of the regulator valve, an inlet conduit connected to said sample vessel, a pressure responsive pressure reducing regulator valve having a control pressure chamber controlling flow through said inlet conduit, and a conduit interconnecting the sealed vessel and the control pressure chamber of the pressure responsive regulator valve whereby the pressure in the sample vessel is controlled by the pressure in the sealed vessel.

4. The gravitometer of claim 3 wherein the inlet line has a valve controlled connection with the sealed vessel to permit pressurizing of the sealed vessel with the gas to be measured.

5. The gravitometer of claim 3 wherein a U-tube manometer is connected across the two vessels.

6. The gravitometer of claim 3 wherein the pressure responsive regulator valve maintains equal pressures in the two vessels and the regulator valve in the outlet conduit is set to reduce the pressure downstream of the valve to a lower pressure than in the sample vessel and provide a constant pressure of gas to the restriction.

7. A gravitometer comprising, a balance including a closed sealed vessel and a closed sample vessel supported by a balance beam on opposite sides of a pivot point, means for measuring movements of the balance beam about its pivot, means for maintaining a back pressure on the sample vessel, an inlet conduit connected to said sample vessel, and means controlled by the pressure in the sealed vessel regulating flow of gas through the inlet conduit to the sample vessel and maintaining the pressure in the sample vessel proportional to the pressure in the sealed vessel.

References Cited in the file of this patent
UNITED STATES PATENTS

| | | |
|---|---|---|
| 1,787,256 | Lima | Dec. 30, 1930 |
| 2,106,966 | Binckley | Feb. 1, 1938 |
| 2,641,923 | Binckley | June 16, 1953 |
| 2,777,320 | Boulestreau | Jan. 15, 1957 |
| 2,838,927 | Gray | June 17, 1958 |